US 12,309,678 B2

(12) United States Patent
Tamura

(10) Patent No.: US 12,309,678 B2
(45) Date of Patent: *May 20, 2025

(54) MOBILE COMMUNICATION SYSTEM, MME, TERMINALS AND METHOD FOR COMMUNICATION

(71) Applicant: NEC Corporation, Tokyo (JP)

(72) Inventor: Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 372 days.

This patent is subject to a terminal disclaimer.

(21) Appl. No.: 17/865,742

(22) Filed: Jul. 15, 2022

(65) Prior Publication Data

US 2022/0353659 A1    Nov. 3, 2022

Related U.S. Application Data

(63) Continuation of application No. 16/597,403, filed on Oct. 9, 2019, now Pat. No. 11,445,345, which is a
(Continued)

(30) Foreign Application Priority Data

Jul. 24, 2015   (JP) ................................. 2015-146266

(51) Int. Cl.
*H04W 4/70*    (2018.01)
*H04L 41/0806*    (2022.01)
(Continued)

(52) U.S. Cl.
CPC ........... *H04W 4/70* (2018.02); *H04L 41/0806* (2013.01); *H04W 4/20* (2013.01); *H04W 8/22* (2013.01);
(Continued)

(58) Field of Classification Search
CPC ......... H04W 4/70; H04W 76/10; H04W 4/20; H04W 8/22; H04W 60/00; H04W 84/18; H04L 41/0806
See application file for complete search history.

(56) References Cited

U.S. PATENT DOCUMENTS

2011/0014912 A1    1/2011 Ahluwalia ............ H04W 76/11
455/435.1
2012/0302254 A1   11/2012 Charbit et al.
(Continued)

FOREIGN PATENT DOCUMENTS

CN    102271367        12/2011
CN    103002428 A       3/2013
(Continued)

OTHER PUBLICATIONS

Indian Office Communication for IN Application No. 201817004072 mailed on Jun. 2, 2022.
(Continued)

*Primary Examiner* — Siren Wei
(74) *Attorney, Agent, or Firm* — Dickinson Wright PLLC

(57) ABSTRACT

An object is to provide a network apparatus capable of performing a communication procedure suitable for accommodating an IoT device. A network apparatus (10) according to present disclosure includes a communication unit (11) configured to receive profile information of a communication terminal (20) transmitted from the communication terminal (20), and a determination unit (12) configured to determine, in a procedure for establishing a radio link between the network apparatus (10) and the communication terminal (20), whether or not to skip at least one of a procedure for configuring a radio resource used for communication of user data between the network apparatus (10) and the communication terminal (20) and a procedure for setting security between the network apparatus (10) and the
(Continued)

communication terminal (20) according to the profile information, in which the communication unit (11) receives small data transmitted from the communication terminal (20) through the radio link.

12 Claims, 12 Drawing Sheets

Related U.S. Application Data continuation of application No. 15/747,034, filed as application No. PCT/JP2016/003392 on Jul. 20, 2016, now Pat. No. 11,272,337.

(51) Int. Cl.
*H04W 4/20* (2018.01)
*H04W 8/22* (2009.01)
*H04W 60/00* (2009.01)
*H04W 76/10* (2018.01)
*H04W 84/18* (2009.01)

(52) U.S. Cl.
CPC ........... *H04W 60/00* (2013.01); *H04W 76/10* (2018.02); *H04W 84/18* (2013.01)

(56) References Cited

U.S. PATENT DOCUMENTS

| | | | |
|---|---|---|---|
| 2013/0080587 A1 | 3/2013 | Liao | H04W 4/70 709/219 |
| 2013/0080597 A1* | 3/2013 | Liao | H04L 5/0001 709/219 |
| 2013/0083726 A1* | 4/2013 | Jain | H04W 28/0289 370/328 |
| 2013/0083765 A1 | 4/2013 | Ai | H04W 4/70 370/329 |
| 2013/0100895 A1 | 4/2013 | Aghili et al. | |
| 2014/0036795 A1 | 2/2014 | Martinez Tarradell | H04W 48/14 370/329 |
| 2014/0242970 A1 | 8/2014 | Yu et al. | |
| 2015/0373733 A1 | 12/2015 | Bangolae et al. | |
| 2016/0227590 A1 | 8/2016 | Huang | H04W 76/12 |
| 2016/0373976 A1* | 12/2016 | Griot | H04W 36/0022 |
| 2018/0109941 A1 | 4/2018 | Jain | H04W 28/0226 |
| 2018/0152984 A1* | 5/2018 | Palanisamy | H04W 76/12 |

FOREIGN PATENT DOCUMENTS

| | | |
|---|---|---|
| JP | 2011-45038 | 3/2011 |
| JP | 2013-529402 | 7/2013 |
| JP | 2014-17801 | 1/2014 |
| JP | 2014-72674 | 4/2014 |
| WO | 2011/094954 A1 | 8/2011 |
| WO | WO 2014/041805 A1 | 3/2014 |
| WO | WO 2014/181439 | 11/2014 |
| WO | WO 2016/075472 A3 | 5/2016 |

OTHER PUBLICATIONS

3GPP TR 23.887, "$3^{rd}$ Generation Partnership Project; Technical Specification Group Serivces and System Aspects; Study on Machine-Type Communications (MTC) and other mobile data applications communications enhancements", (Relese 12), V12.0.0. pp. 1-151 (Dec. 2013).

Office Action dated Sep. 1, 2020, issued by the Japanese Patent Office in counterpart Japanese Patent Application JP 2017-157028.

Keisuke Suzuki, "Other trinominals, core network (EPC) which stores LTE," NTT Docomo Technical Journal, vol. 19 No. 1. Apr. 2011. pp. 28-31.

Office Action dated Jul. 14, 2020, issued by the Japanese Patent Office in counterpart Japanese Patent Application JP 2019-104421.

Office Action dated Mar. 5, 2020 Issued by the Indian Patent Office in counterpart Indian Patent Application No. 201817004072.

International Search Report mailed Oct. 11, 2016, in corresponding PCT International Applications.

Notification of Decision of Refusal dated May 18, 2017, by Japar Patent Office in counterpart Japanese Patent Application 2017-514947.

Notification of Report of Consideration dated Oct. 17, 2017, by Japanese Patent Office In counterpart Japanese Patent Application 2017-514947.

Notification of Reasons for Refusal dated Apr. 19, 2017, by Japanese Patent Office in counterpart Japanese Patent Application 2017-514947.

CATT: "CIoT Architecture for Small Data Transmission", SA WG2 Meeting #110, S2-152394, pp. 1-7 (2015).

Eresson, ST-Ericsson, "More Details on Fast Path Security Protocol", 3GPP TSG SA WG3 (Security) Meeting #72, S3-130848, 10 pages (2013).

3GPP TS 25.331. V12.5.0; $3^{rd}$ Generation Partnership Project; Technical Specification Group Radio Access Network: Radio Resource Control (RRC): Protocol specification, (Release 12), pp. 1-2225 (2015).

3GPP TS 23.401, V13.3.0: $3^{rd}$ Generation Partnership Project: Technical Specification Group Services and System Aspects; General Packet Radio Service (GPRS) Enhancements for Evolved Universal Terrestrial Radio Access Network, (E-UTRAN) Access, (Release 13), pp. 1-324 (2015).

3GPP TS 25.331, V12.5.0; $3^{rd}$ Generation Partnership Project: Technical Specification Group Radio Access Network: Radio Resources Control (RRC); Protocol specification, (Release 12), pp. 1-2225 (2015).

Office Action dated Apr. 8, 2019, by The European Patent Office in counterpart European Patent Application No. 16830037.4.

SA WG2 Meeting #95, "Evaluation of Small Data Solutions", S2-130078, pp. 1-11, (2013).

\* cited by examiner

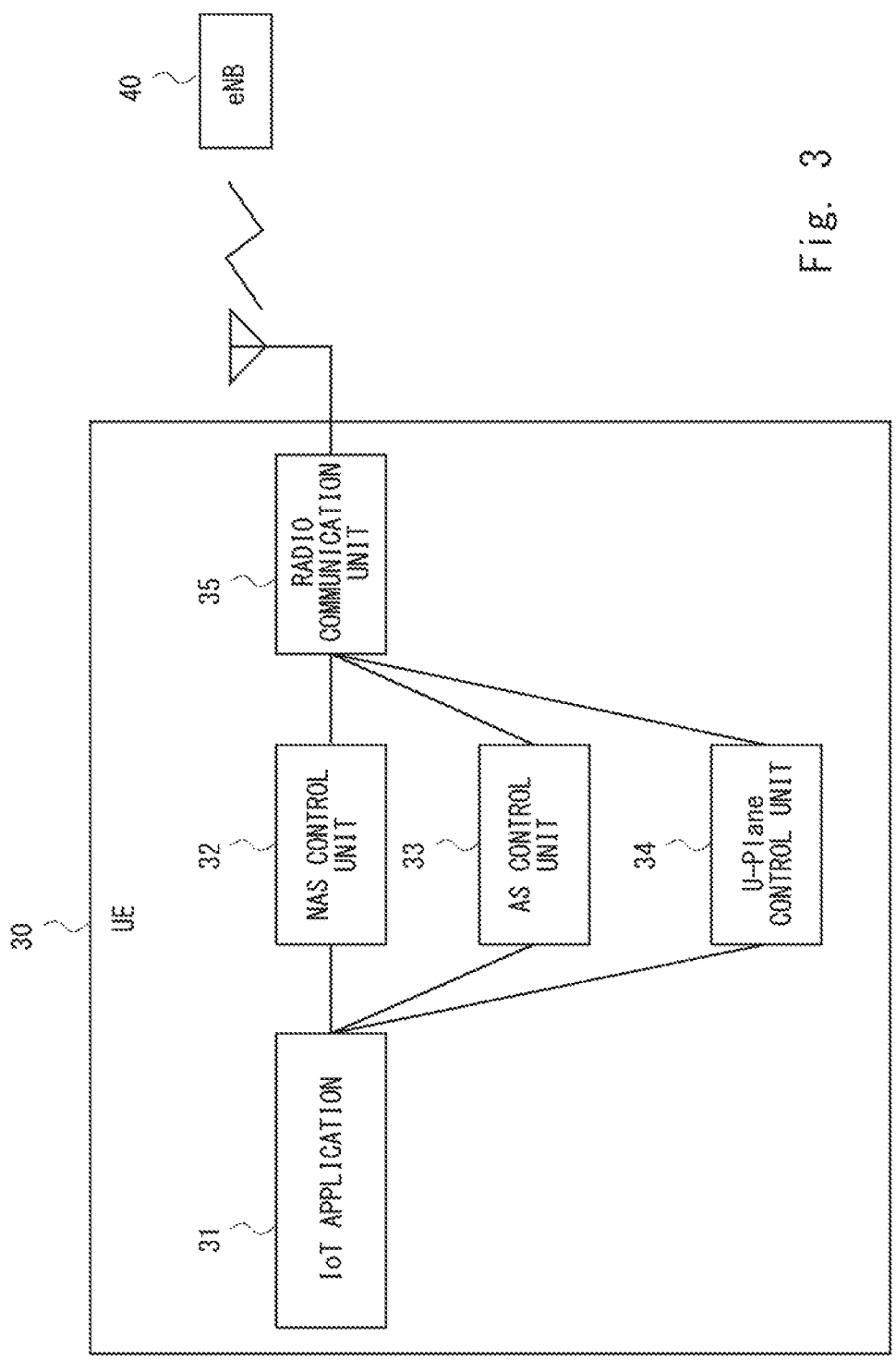

| BIT STRING | METHOD FOR TRANSMITTING SMALL DATA | SECURITY LEVEL | HAND-OVER PROCESS |
|---|---|---|---|
| 0, 0, 0 | 0 (TRANSMISSION USING U-Plane) | 0 (HIGH LEVEL) | 0 (HO IS NECESSARY) |
| 0, 0, 1 | 0 (TRANSMISSION USING U-Plane) | 0 (HIGH LEVEL) | 1 (HO IS UNNECESSARY) |
| 0, 1, 0 | 0 (TRANSMISSION USING U-Plane) | 1 (LOW LEVEL) | 0 (HO IS NECESSARY) |
| 1, 0, 0 | 1 (TRANSMISSION USING C-Plane) | 0 (HIGH LEVEL) | 0 (HO IS NECESSARY) |
| 0, 1, 1 | 0 (TRANSMISSION USING U-Plane) | 1 (LOW LEVEL) | 1 (HO IS UNNECESSARY) |
| 1, 0, 1 | 1 (TRANSMISSION USING C-Plane) | 0 (HIGH LEVEL) | 1 (HO IS UNNECESSARY) |
| 1, 1, 0 | 1 (TRANSMISSION USING C-Plane) | 1 (LOW LEVEL) | 0 (HO IS NECESSARY) |
| 1, 1, 1 | 1 (TRANSMISSION USING C-Plane) | 1 (LOW LEVEL) | 1 (HO IS UNNECESSARY) |

Fig. 4

MOBILE COMMUNICATION SYSTEM, MME, TERMINALS AND METHOD FOR COMMUNICATION

CROSS-REFERENCE TO RELATED APPLICATIONS

The present application is a continuation application of U.S. patent application Ser. No. 16/597,403 filed on Oct. 9, 2019, which is a continuation application of U.S. application Ser. No. 15/747,034 filed on Jan. 23, 2018, which is issued as U.S. Pat. No. 11,272,337, which is a National Stage Entry of international application PCT/JP2016/003392 filed on Jul. 20, 2016, which claims the benefit of priority from Japanese Patent Application No. 2015-146266 filed on Jul. 24, 2015, the disclosures of all of which are incorporated in their entirety by reference herein.

TECHNICAL FIELD

The present disclosure relates to a technique for communicating small data.

BACKGROUND ART

Communication systems that can accommodate a large number of IoT (Internet of Things) devices are currently being studied in 3GPP (3rd Generation Partnership Project).

Examples of IoT devices may be sensor devices, smart-meters, home appliances, vending machines and the like that are connected to the Internet. IoT devices may also be referred to as MTC (Machine Type Communication) devices or M2M (Machine to Machine) devices. For example, IoT devices periodically transmit a very small amount of data to a server apparatus in comparison to the amount of data that typical mobile phones, smart-phones or the like communicate. For example, an IoT device may be a device that periodically transmits data consisting of several tens of bytes.

CITATION LIST

Non Patent Literature

Non-patent Literature 1: 3GPP TS 25.331 V12.5.0 (2015-03) 8.1.3 RRC connection establishment
Non-patent Literature 2: 3GPP TS 23.401 V13.3.0 (2015-06) 5.3.2 Attach procedure

SUMMARY OF INVENTION

Technical Problem

For IoT devices, it has been desired to reduce their power consumptions and thereby enable them to operate for a long time. For example, assuming a case where a company manages a large number of IoT devices, it is desirable that the number of battery-charging operations, battery-replacement operations, and the like be small in view of the management cost. However, in communication systems specified in the current 3GPP, as described in, for example, Non-patent literature 1 and 2, a communication procedure is defined on the assumption that mobile phone terminals or smartphones are mainly accommodated in the communication systems. A mobile phone terminal, a smartphone, or the like frequently transmits/receives a larger amount of data than the amount of data transmitted/received by an IoT device does. That is, communication systems specified in the current 3GPP are not optimal communication systems to accommodate IoT devices, which have been desired to have low power consumptions, thus causing a problem that it is impossible to reduce the power consumptions of the IoT devices.

An object of the present disclosure is to provide a network apparatus, a communication terminal, a communication system, a receiving method, a transmitting method, and a program capable of performing a communication procedure suitable for accommodating an IoT device.

Solution to Problem

A network apparatus according to a first aspect of the present disclosure includes: a communication unit configured to receive profile information of a communication terminal transmitted from the communication terminal; and a determination unit configured to determine, in a procedure for establishing a radio link between the network apparatus and the communication terminal, whether or not to skip at least one of a procedure for configuring a radio resource used for communication of user data between the network apparatus and the communication terminal and a procedure for setting security between the network apparatus and the communication terminal according to the profile information, in which the communication unit receives small data transmitted from the communication terminal through the radio link.

A communication terminal according to a second aspect of the present disclosure includes: a communication unit configured to transmit profile information of the communication terminal itself to a network apparatus; and a reception unit configured to receive, in a procedure for establishing a radio link between the communication terminal and the network apparatus, information about whether or not the communication terminal can skip at least one of a procedure for configuring a radio resource used for communication of user data between the communication terminal and the network apparatus and a procedure for setting security between the communication terminal and the network apparatus according to the profile information from the network apparatus, in which the communication unit transmits small data to the network apparatus through the radio link.

A communication system according to a third aspect of the present disclosure includes: a communication terminal; a base station configured to perform radio communication with the communication terminal; and a core-network apparatus configured to control a procedure for establishing a radio link between the communication terminal and the base station, in which when the core-network apparatus receives profile information of the communication terminal transmitted from the communication terminal, the core-network apparatus transmits, in the procedure for establishing the radio link, an instruction message to the base station, the instruction message instructing to skip at least one of a procedure for configuring a radio resource used for communication of user data between the base station and the communication terminal and a procedure for setting security between the base station and the communication terminal, the base station performs the procedure for establishing the radio link while skipping at least one of the procedure for configuring the radio resource used for communication of user data between the base station and the communication terminal and the procedure for setting security between the base station and the communication terminal according to the instruction message, and the communication terminal transmits small data to the base station through the radio link.

A receiving method according to a fourth aspect of the present disclosure includes: receiving profile information of a communication terminal transmitted from the communication terminal; determining, in a procedure for establishing a radio link with the communication terminal, whether or not to skip at least one of a procedure for configuring a radio resource used for communication of user data with the communication terminal and a procedure for setting security with the communication terminal according to the profile information; and receiving small data transmitted from the communication terminal through the radio link.

A transmitting method according to a fifth aspect of the present disclosure includes: transmitting profile information of an own terminal to a network apparatus; receiving, in a procedure for establishing a radio link with the network apparatus, information about whether or not the communication terminal can skip at least one of a procedure for configuring a radio resource used for communication of user data with the network apparatus and a procedure for setting security with the network apparatus according to the profile information from the network apparatus; and transmitting small data to the network apparatus through the radio link.

A program according to a sixth aspect of the present disclosure is adapted to cause a computer to: receive profile information of a communication terminal transmitted from the communication terminal; determine, in a procedure for establishing a radio link with the communication terminal, whether or not to skip at least one of a procedure for configuring a radio resource used for communication of user data with the communication terminal and a procedure for setting security with the communication terminal according to the profile information; and receive small data transmitted from the communication terminal through the radio link.

Advantageous Effects of Invention

According to the present disclosure, it is possible to provide a network apparatus, a communication terminal, a communication system, a receiving method, a transmitting method, and a program capable of performing a communication procedure suitable for accommodating an IoT device.

BRIEF DESCRIPTION OF DRAWINGS

FIG. 3 is a configuration diagram of a UE according to a second embodiment;

FIG. 4 is a table for explaining category information according to the second embodiment;

DESCRIPTION OF EMBODIMENTS

First Embodiment

Figure 1:
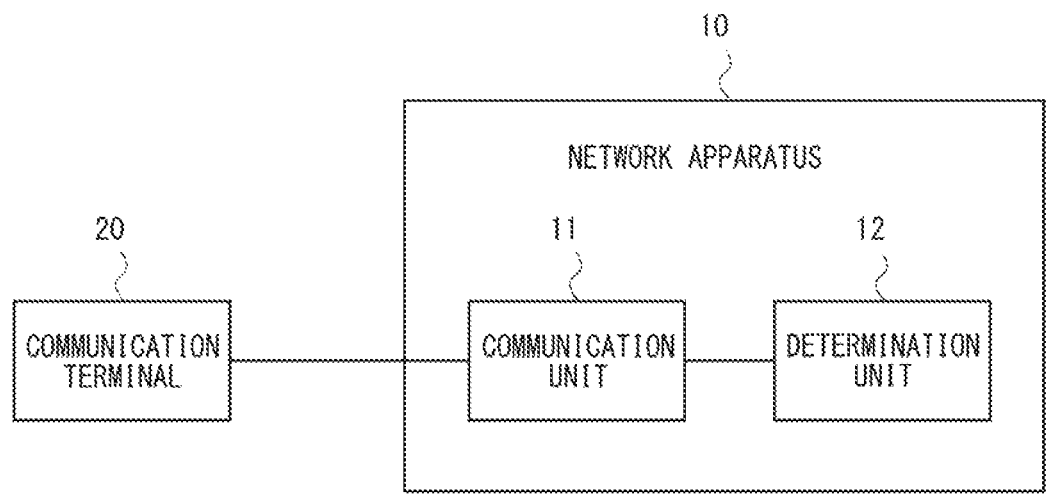
FIG. 1 is a configuration diagram of a network apparatus according to a first embodiment.

With reference to the drawings, embodiments of the present disclosure are explained below. At first, a configuration example of a network apparatus 10 according to a first embodiment of the present disclosure is explained below by referring to FIG. 1. The network apparatus 10 may be a computer apparatus that operates by having its processor execute a program stored in a memory. For example, the network apparatus 10 may be an apparatus that is located in a communication network administered by a telecommunication carrier. The network apparatus 10 may also be a communication apparatus such as a base station, a server apparatus, a switching apparatus and the like. Alternatively, the network apparatus 10 may be a router apparatus or the like.

The network apparatus 10 includes a communication unit 11 (also referred to as a transmitting and receiving unit) and a determination unit 12. The communication unit 11 and the determination unit 12, which are components of the network apparatus 10, may be software or a module which is executed by causing a processor to execute a program stored in a memory. Alternatively, these components of the network apparatus 10 may be hardware or a chip.

The communication unit 11 receives profile information of the communication terminal 20 transmitted from the communication terminal 20. The communication terminal 20 may be an IoT device that autonomously performs communication without any operation by users. IoT devices may be MTC (Machine Type Communication) devices, M2M (Machine to Machine) devices and the like. Further, the communication terminal 20 may be a sensor device, a smart-meter, a home appliance, a vending machine and the like. Further, data transmitted from IoT devices is assumed to be small data. Small data can be transmitted even by radio resources for control data since the transferred volume of the small data is small. Therefore, in the case of transmitting small data by radio resources for control data, it becomes unnecessary to provide radio resources for user data.

The profile information of the communication terminal 20 may be information in which operations of the communication terminal 20 or processing to be performed by the communication terminal 20 are specified.

In the procedure for establishing a radio link between the network apparatus 10 and the communication terminal 20, the determination unit 12 determines whether or not at least one of a procedure for configuring radio resources used for communicating user data between the network apparatus 10 and the communication terminal 20 and a procedure for setting security between the network apparatus 10 and the communication terminal 20 should be skipped according to the profile information transmitted from the communication terminal 20.

When wirelessly communicating with the communication terminal 20, the network apparatus 10 establishes a radio link between the network apparatus 10 and the communication terminal 20. For example, the radio link may be established between the network apparatus 10 and the communication terminal 20 at a timing at which the power supply of the battery in the communication terminal 20 is changed from an OFF state to an ON state, in a predetermined cycle, or at a timing at which the communication terminal 20 transmits data.

The establishment of the radio link is performed according to a predetermined procedure. The predetermined procedure may be defined by a telecommunication carrier that administrates the network apparatus 10. Alternatively, the predetermined procedure may be defined according to 3GPP or the like. Further, the establishment of the radio link may also be expressed as a configuration of a radio bearer, a configuration of a radio communication channel or the like.

Radio resources used for communication (transmission or reception of data) of user data may be, for example, a radio communication channel used by the communication terminal 20 for transmitting and receiving user data such as text data, audio data and image data between the communication terminal 20 and the network apparatus 10. Alternatively, the radio resources may be frequency bands, communication timing, transmission power and the like that are allocated to the communication terminal 20 for performing communication. In general, a U-Plane (User Plane) is used for communication of user data.

Separately from the radio resource used for communicating user data, there is a radio resource which is used for communicating control data. The control data is data that is used by the communication terminal 20 for starting, finishing or maintaining communication. In general, control data has a smaller amount of data in comparison to the amount of user data. In general, a C-Plane (Control Plane) is used for communication of control data.

For example, in a case where the profile information of the communication terminal 20 indicates that the communication terminal 20 does not transmit/receive user data, the determination unit 12 may skip the procedure for configuring the radio resources used for communicating user data. Further, in the case where the profile information of the communication terminal 20 indicates that the communication terminal 20 does not require a high level of security, the determination unit 12 may skip the procedure for security setting.

Here, the communication unit 11 receives small data transmitted from the communication terminal 20 via the radio link established based on the result of a determination made by the determination unit 12. For example, the small data may be data generated by an IoT device. The small data is data having a sufficiently smaller volume in comparison to the volume of user data such as telephone call data, image data or the like. For example, the small data may be sensor data, data having a small volume (in the order of, for example, several tens of bytes) that are periodically transmitted to the network apparatus 10, and the like. Further, the communication unit 11 also performs data transmission from the network apparatus 10 to the communication terminal 20. When the determination unit 12 determines that small data can be communicated by using the radio resources for control data (C-Plane), instead of using the radio resource for user data (U-Plane), because the volume of that small data is small, the determination unit 12 can skip the procedure for configuring radio resources for user data. Further, when it is determined that a high level of security is not required because of the small volume of data, the determination unit 12 can skip the procedure for security setting.

As explained above, the network apparatus 10 can change the procedure performed at the time of establishing a radio link between the network apparatus 10 and the communication terminal 20 depending on the profile information of the communication terminal 20. Particularly, the network apparatus 10 can skip some of the procedures performed at the time of establishing a radio link between the network apparatus 10 and the communication terminal 20 depending on the profile information.

The communication terminal 20 can reduce the power consumption by skipping some of the procedures performed at the time of establishing a radio link between the communication terminal 20 and the network apparatus 10. Thereby, the frequency of the replacement or the like of the battery in the communication terminal 20 can be reduced. Thus, even in the case where a company or an organization connects a large number of communication terminals 20 to the network apparatus 10, an increase of the cost required to replace batteries in these communication terminals 20 can be minimized.

Second Embodiment

Figure 2:
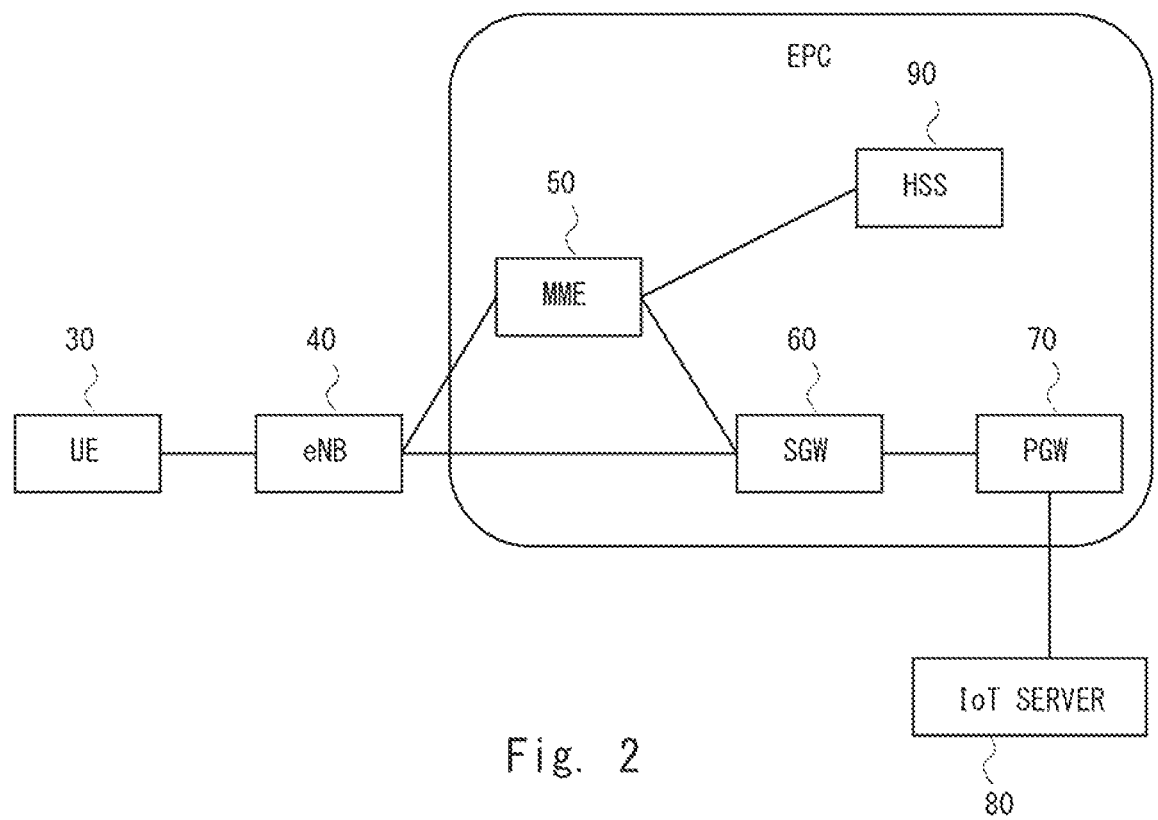
FIG. 2 is a configuration diagram of a communication system according to a second embodiment.

Next, a configuration example of a communication system according to a second embodiment of the present disclosure is explained with reference to FIG. 2. The communication system shown in FIG. 2 comprises node apparatus specified in 3GPP.

The term "UE (User Equipment) 30" is used to collectively refer to communication terminals specified in 3GPP. The UE 30 corresponds to the communication terminal 20 shown in FIG. 1. The explanations below are given on the assumption that UEs 30 are IoT devices.

A base station apparatus, i.e., an eNB (evolved NodeB) 40 performs wireless communication with the UE 30. For example, the eNB 40 performs wireless communication with the UE 30 using LTE (Long Term evolution) as a radio communication system. Further, the eNB 40 relays control data that are transmitted/received between the UE 30 and an MME (Mobility Management Entity) 50. Here, the eNB may be an RAN (Radio Access Network), an RNC (Radio Network Controller) or a BSC (Base Station Controller) for CIoT (Cellular IoT). Alternatively, the MME may be a mobility management apparatus, a packet switching apparatus, an SGSN or the like for CIoT. Further, UEs may be terminals that perform communication using a 2G wireless technology, a 3G wireless technology, an LTE wireless technology or wireless technologies dedicated for CIoT.

The MME 50 performs mobility management of the UE 30, authentication of the UE 30, setup processing of a user data transfer path, etc. The MME 50 relays control data transmitted/received between the eNB 40 and an SGW (Serving Gateway) 60. The MME 50 or the eNB 40 corresponds to the network apparatus 10 shown in FIG. 1. Alternatively, the functions implemented in the network apparatus 10 may be disposed in a distributed manner in the MME 50 and the eNB 40.

The SGW 60 receives control data for UE 30 transmitted from the MME 50. Further, the SGW 60 sets up a communication path for transferring user data for the UE 30 between the SGW 60 and a PGW (Packet Data Network Gateway) 70. The SGW 60 receives small data which has been transmitted from the UE 30 via the MME 50 by resources for control data communication (i.e., by the C-Plane). The SGW 60 transmits the received small data to the PGW 70 by using the C-plane or by using the resources for user data communication (i.e., by the U-Plane). Moreover, the SGW 60 may transmit the small data for the UE 30 transmitted from the PGW 70 to the MME 50 by using the C-Plane.

The PGW 70 transmits the user data, that has been transmitted from an IoT server 80 or the like and is addressed to the UE 30, to the SGW 60. Moreover, the PGW 70 transmits the small data transmitted from the SGW 60 to the IoT server 80 or the like. Here, the MME 50, the SGW 60, and the PGW 70 may be collectively referred to as EPC (Evolved Packet Core) specified in 3GPP. Moreover, the MME 50, the SGW 60, and the PGW 70 may also be referred to as core network apparatus, etc.

The IoT server 80 may be a server which is administered by a company different from the telecommunication carrier which administrates the EPC, or may be a server administered by the telecommunication carrier that administrates the EPC. The IoT server 80 and the PGW 70 may communicate through the Internet which is a public IP network. The IoT server 80 manages UEs 30 used as IoT devices. Further, the IoT server 80 may receive small data transmitted from UEs 30 used as IoT devices, and may perform analysis of the small data, etc.

Next, a configuration example of the UE 30 according to the second embodiment of the present disclosure is explained below with reference to FIG. 3. The UE 30 has an IoT application 31, a NAS (Non-Access Stratum) control unit 32, an AS (Access Stratum) control unit 33, a U-Plane (User-Plane) control unit 34, and a radio communication unit 35. Each of the components constituting the UE 30 may be software or a module by which a process is performed by causing a processor to execute a program stored in a memory. Alternatively, each of the components constituting the UE 30 may be implemented as hardware or a chip.

The IoT application 31 generates small data to be transmitted to the IoT server 80. Here, a specific example of small data is explained. For example, when the UE 30 is a smart meter, the IoT application 31 may generate data indicating an electrical power consumption as small data. Alternatively, when the UE 30 may be a sensor device which detects temperature, humidity, etc., the IoT application 31 may generate data indicating detected temperature, humidity, etc., as small data. Further, the small data may be information managed by the UE 30 or information detected by the UE 30 or other types of information.

The NAS control unit 32 generates an NAS message which is transmitted/received to/from the MME 50 through the eNB 40. Further, the NAS control unit 32 receives the NAS message transmitted from the MME 50 through the eNB 40 and performs processing specified in the NAS message. The eNB 40 transmits the received NAS message to the UE 30 or the MME 50 without performing processing related to the NAS message. In other words, the eNB 40 transparently transfers the NAS message transmitted from the UE 30 or the MME 50. Note that the NAS message is control data.

The NAS control unit 32 generates a NAS message including profile information about the UE 30. Further, the NAS control unit 32 generates a NAS message containing small data when it transmits the small data along with control data by using the C-Plane.

The AS control unit 33 generates an AS message to be transmitted/received to/from the eNB 40. Further, the AS control unit 33 receives the AS message transmitted from the eNB 40 and performs processing specified in the AS message. The AS control unit 33 generates an AS message including the profile information for the UE 30.

The U-Plane control unit 34 performs a process for establishing a communication line or a channel used to transmit/receive user data to/from the eNB 40. Here, the NAS control unit 32 and the AS control unit 33 may be collectively referred to as a C-Plane (Control-Plane) control unit (not shown). The C-Plane control unit performs a process for establishing a communication line or a channel used to transmit/receive control data to/from the eNB 40.

The radio communication unit 35 performs a process for wirelessly communicating with the eNB 40. For example, the radio communication unit 35 modulates a signal containing transmission data into a desired frequency and thereby generates a radio signal. Further, the radio communication unit 35 transmits the generated radio signal to the eNB 40. Alternatively, the radio communication unit 35 demodulates a radio signal transmitted from the eNB 40 and outputs the demodulated signal to the NAS control unit 32, the AS control unit 33, or the U-Plane control unit 34.

Here, profile information included in a NAS message or an AS message is explained below. Profile information on the UE 30 may be information about operations or a contract of the UE 30, or information specifying processing performed in the UE 30 and so on.

For example, the below-shown information may be included in the profile information on the UE 30 which is an IoT device. Moreover, the below-shown information may be information that is set up every time the UE 30 transmits small data.

(1) Information indicating that Traffic Channel (U-Plane) for transmitting user data is made unnecessary (hereafter referred to as Traffic Channel unnecessary information) because small data is transmitted by using the C-Plane as in the case of control data, (2) Information indicating that a security level lower than the security level used in an ordinary smart phone, etc., is requested (hereafter referred to as low-security request information), and (3) Information indicating that hand-over processing is made unnecessary because the UE 30 does not move (hereafter referred to as hand-over process unnecessary information).

The "Traffic Channel unnecessary information" explained in the item (1) may be information indicating an amount (size) of information of small data. In this case, the eNB 40 or the MME 50 determines whether the Traffic Channel (U-Plane) is necessary or not in consideration of the amount (size) of information of the small data. The low security level explained in the item (2) may indicate that, for example, the small data does not need to be encrypted or needs to be encrypted in a simplified level.

Moreover, the hand-over processing explained in the item (3) includes hand-over processing (Intra RAT (Radio Access Technology) HO (Hand Over)) between base stations using the same radio communication system and hand-over processing (Inter RAT HO (Hand Over)) between base stations using different radio communication systems.

Moreover, category information on the UE 30 which indicates whether or not small data can be transmitted using the C-Plane as in the case of control data, whether or not a low security level can be requested, and whether or not hand-over processing can be made unnecessary may be set in the profile information.

For example, as shown in FIG. 4, the category information on the UE 30 may be represented by using a bit string consisting of three bits. When small data is transmitted using the C-Plane (Control Plain), a value "1" is set to the first bit, and when small data is transmitted using the U-Plane (User Plain), a value "0" is set to the first bit. Further, when a low security level is requested, a value "1" is set to the second bit, and when a high security level is requested, a value "0" is set to the second bit. Furthermore, when hand-over processing is unnecessary, a value "1" is set to the third bit, and when the hand-over processing is necessary, a value "0" is set to the third bit. The category information on the UE 30 may not be limited to the example shown in FIG. 4. That is, a bit string consisting of four bits or more, or two bits or less may be used according to the number of information pieces to be set. Note that "0" and "1" may also be expressed as setting/non-setting of a flag.

Figure 5:
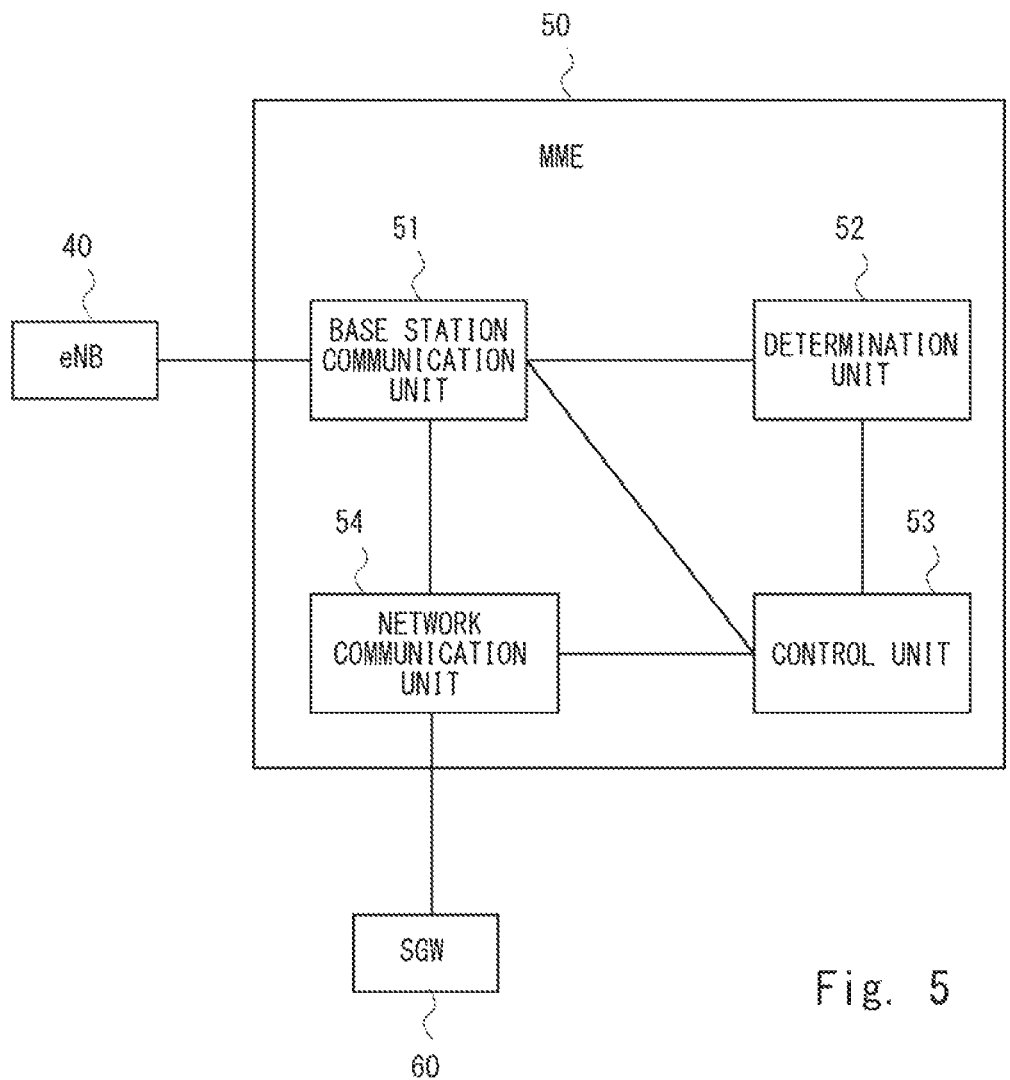
FIG. 5 is a configuration diagram of a MME according to the second embodiment.

Next, a configuration example of the MME 50 according to the second embodiment of the present disclosure is explained below with reference to FIG. 5. The MME 50 includes a base station communication unit 51, a determination unit 52, a control unit 53, and a network communication unit 54. Each of the components which constitute the MME 50 may be software or a module by which a process is performed by causing a processor to execute a program stored in a memory. Alternatively, each of the components constituting the MME 50 may be implemented as hardware or a chip.

The base station communication unit 51 receives an NAS message transmitted from the UE 30 through the eNB 40. The base station communication unit 51 outputs the received NAS message to the determination unit 52. Moreover, the base station communication unit 51 may output small data to the network communication unit 54 when the small data is contained in the NAS message. Moreover, the base station communication unit 51 receives an S1 message transmitted from the eNB 40. Here, S1 is a reference point specified in 3GPP. The base station communication unit 51 outputs the received S1 message to the determination unit 52. The eNB 40 may transmit an eNB type (information indicating an ability of the eNB, may also be referred to as a NodeB type) to the MME 50 by using the S1 message. Here, the "eNB type" indicates that the eNB 40 can support an operation by which a radio resource configuring procedure can be changed, an operation by which a security setting procedure can be skipped, or an operation by which processing for hand-over can be stopped according to an instruction from the MME 50.

Depending on the profile information on the UE 30 contained in the NAS message, the determination unit 52 determines whether or not to skip at least one of the procedure for configuring the radio resource used for communication of user data between the MME 50 and the UE 30, and the procedure for setting security between the MME 50 and the UE 30. The determination unit 52 outputs a result of the determination to the control unit 53. Note that the determination unit 52 may obtain subscriber information from an HSS 90 and use information about IoT contained in the obtained subscriber information for the above-mentioned determination.

When the control unit 53 receives a determination result indicating that, for example, the radio resource configuring procedure is skipped, it transmits a message indicating that the radio resource configuring procedure is skipped to the eNB 40 through the base station communication unit 51. Alternatively, when the control unit 53 receives information indicating an amount (a size) of information of small data transmitted from the UE 30 and it determines that the radio resource configuring procedure can be skipped based on the analysis of the information, the control unit 53 transmits a message instructing to skip the radio resource configuring procedure to the eNB 40 through the base station communication unit 51. Further, when the control unit 53 receives a determination result indicating that the security setting procedure is skipped, it transmits a message instructing to skip the security setting procedure to the eNB 40 through the base station communication unit 51. Further, when the control unit 53 receives a determination result indicating that the radio resource configuring procedure and the security setting procedure are skipped, it transmits a message instructing to skip both procedures to the eNB 40 through the base station communication unit 51. Further, when the control unit 53 receives a determination result indicating that the hand-over process is unnecessary, it transmits a message instructing to stop the process related to the hand-over to the eNB 40 through the base station communication unit 51.

Further, the control unit 53 transmits an EPC type indicating that it can transmit a message instructing to skip the radio resource configuring procedure and the security setting procedure to the eNB 40 according to the profile information (i.e., information indicating an ability of the EPC) to the UE 30 through the eNB 40. Further, the control unit 53 may transmit the EPC type to the eNB 40 by using an S1 message.

The network communication unit 54 transmits the small data output from the base station communication unit 51 to the SGW 60 by using a GTP (General Packet Radio Service Tunneling Protocol)-C message.

Figure 6:
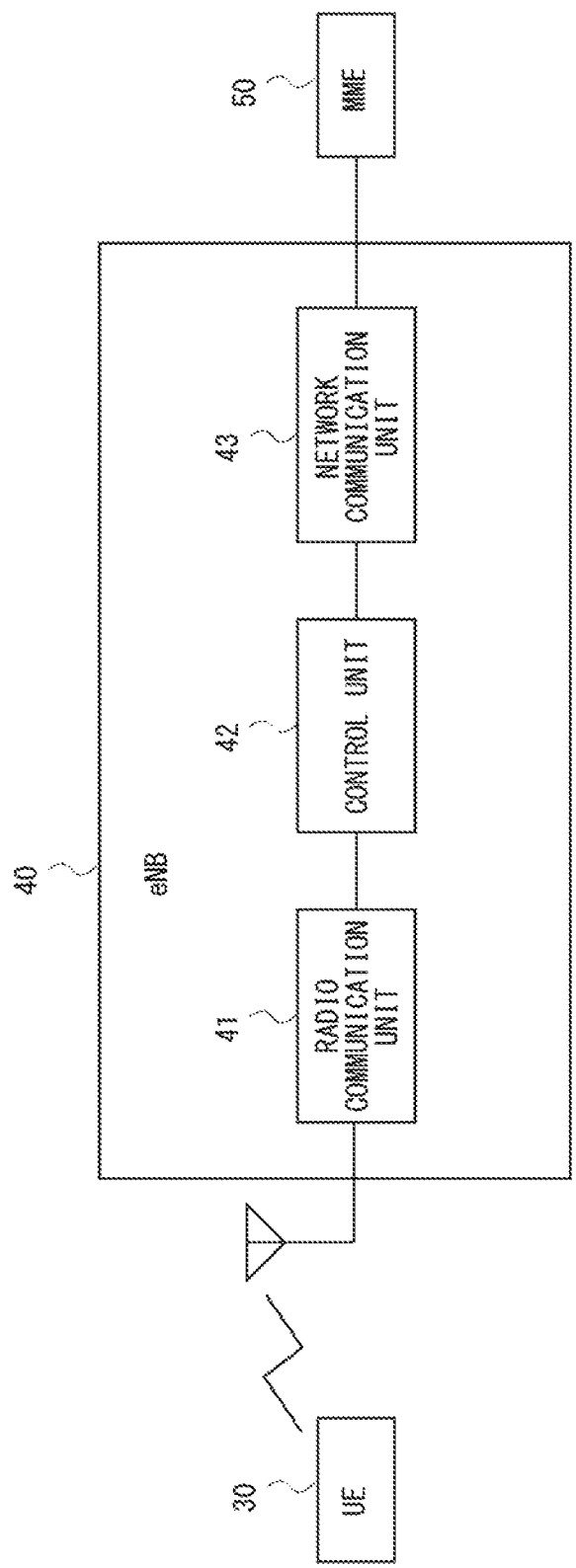
FIG. 6 is a configuration diagram of an eNB according to the second embodiment.

Next, a configuration example of the eNB 40 according to the second embodiment of the present disclosure is explained with reference to FIG. 6. The eNB 40 includes a radio communication unit 41, a control unit 42, and a network communication unit 43. Each of the components constituting the eNB 40 may be software, a module, or the like by which a process is performed by having a processor execute a program stored in a memory. Alternatively, each of the components constituting the eNB 40 may be hardware, a chip, or the like.

The radio communication unit 41 performs a process for performing radio communication with the UE 30. For example, the radio communication unit 41 generates a radio signal by modulating a signal including transmission data into a desired frequency and transmits the generated radio signal to the UE 30. Alternatively, the radio communication unit 41 demodulates a radio signal transmitted from the UE 30 and outputs the demodulated signal to the control unit 42.

The network communication unit 43 is used as an interface for communicating with the MME 50. For example, the network communication unit 43 transmits/receives control data to/from the MME 50.

The control unit 42 performs a procedure for establishing a radio link with the UE 30 based on an instruction transmitted from the MME 50. Specifically, the control unit 42 establishes a radio link by transmitting/receiving control data to/from the UE 30. Note that the control unit 42 performs control so that it does not transmit a message related to the process which the MME 50 has instructed to skip to the UE 30.

Further, the control unit 42 performs control so as to transmit an eNB type indicating that among the processes for establishing the radio link, the radio resource configuring procedure and the security setting procedure can be skipped according to the profile information to the UE 30 through the radio communication unit 41.

As a comparative example for the present disclosure, a typical procedure for establishing a radio link specified in 3GPP is explained hereinafter with reference to FIGS. 9 and 10. It is assumed that the UE 30 has not performed communication for a predetermined period and hence has entered an IDLE mode. It is assumed that in the IDLE mode, the UE 30 is not synchronized with the eNB 40.

Firstly, the UE 30 transmits an RRC (Radio Resource Control) Connection Request message to the eNB 40 in order to start communication with the eNB 40 (S11). Next, in response to the RRC Connection Request message, the eNB 40 transmits an RRC Connection Setup message to the UE 30 (S12).

Next, the UE 30 transmits an RRC Connection Setup Complete message to the eNB 40 (S13). The UE 30 transmits an RRC Connection Setup Complete message including an NAS message used in an NAS protocol to the eNB 40. In other words, the UE 30 transmits an RRC message multiplexed with an NAS message to the eNB 40. In particular, the RRC Connection Setup Complete message includes a Service Request message as the NAS message. When the UE 30 starts communication, it transmits a Service Request message to the MME 50.

Next, the eNB 40 transmits an Initial UE message to the MME 50. The eNB 40 sets the Service Request message included in the RRC Connection Setup Complete message in the Initial UE message (S14).

Next, the MME 50 transmits an Initial Context Setup Request message to the eNB 40 in order to instruct to set a Traffic Channel that is used to transmit/receive user data between the UE 30 and the eNB 40 (S15). The MME 50 may incorporate, for example, a security Key used in a security setting between the UE 30 and the eNB 40 into the Initial Context Setup Request message. The security Key included in the Initial Context Setup Request message may be a security Key different from a security Key that was used when a security setting was made between the UE 30 and the eNB 40 in the past. By using a different security Key every time an RRC connection is established between the UE 30 and the eNB 40, high security can be achieved.

Next, the eNB 40 transmits a Security Mode Command message to the UE 30 in order to perform a security setting between the eNB 40 and the UE 30 (S16). In response to the Security Mode Command message, the UE 30 transmits a Security Mode Complete message to the eNB 40 (S17). In the steps S16 and S17, the security Key that is transmitted from the MME 50 in the step S15 is used.

Next, the eNB 40 transmits an RRC Connection Reconfiguration to the UE 30 in order to transmit/receive user data to/from the UE 30 by using the RRC connection therebetween (S18). Next, in response to the RRC Connection Reconfiguration message, the UE 30 transmits an RRC Connection Reconfiguration Complete message to the eNB 40.

Next, in response to the Initial Context Setup Request message transmitted in the step S15, the eNB 40 transmits an Initial Context Setup Response message to the MME 50 (S20). Next, the MME 50 transmits a Modify Bearer Request message to the SGW 60 in order to instruct to set a path that is used to transmit/receive user data between the eNB 40 and the SGW 60 (S21). The SGW 60 further transmits the Modify Bearer Request message to a PGW 70 in order to set a path that is used to transmit/receive user data to/from the PGW 70.

When a transfer path for user data is established through the processes up to the step S21, the UE 30 transmits a UDP (User Datagram Protocol)/IP(Internet Protocol) packet to the eNB 40 (S22). Further, the eNB 40 transmits the UDP/IP packet to the SGW 60 (S23). Further, the MME 50 receives a Modify Bearer Response message from the SGW 60 as a response to the Modify Bearer Request message transmitted in the step S21 (S24).

Next, the SGW 60 transmits the UDP/IP packet, which is addressed to the UE 30, to the eNB 40 (S25). Next, the eNB 40 transmits the received UDP/IP packet to the UE 30 (S26).

Next, the UE 30 transmits a Measurement Report message indicating a result of measurement of reception quality and the like of signals transmitted from eNBs adjacent to the eNB 40 to the eNB 40 (S27).

Next, the eNB 40 releases an Inactivity Timer indicating a period of radio communication between the eNB 40 and the UE 30, or detects that the Inactivity Timer has expired (S28).

Next, the eNB 40 transmits a UE Context Release Request message to the MME 50 in order to request to release a radio bearer between the eNB 40 and the UE 30 (S29). Next, the MME 50 transmits a UE Context Release Command message instructing to release the radio bearer between the UE 30 and the eNB 40 to the eNB 40 (S30). Next, the eNB 40 transmits an RRC Connection Release message to the UE 30 in order to release the radio bearer between the eNB 40 and the UE 30 (S31). Next, the eNB 40 transmits a UE Context Release Complete message indicating that the radio bearer between the eNB 40 and the UE 30 has been released to the MME 50 (S32).

Figure 9:
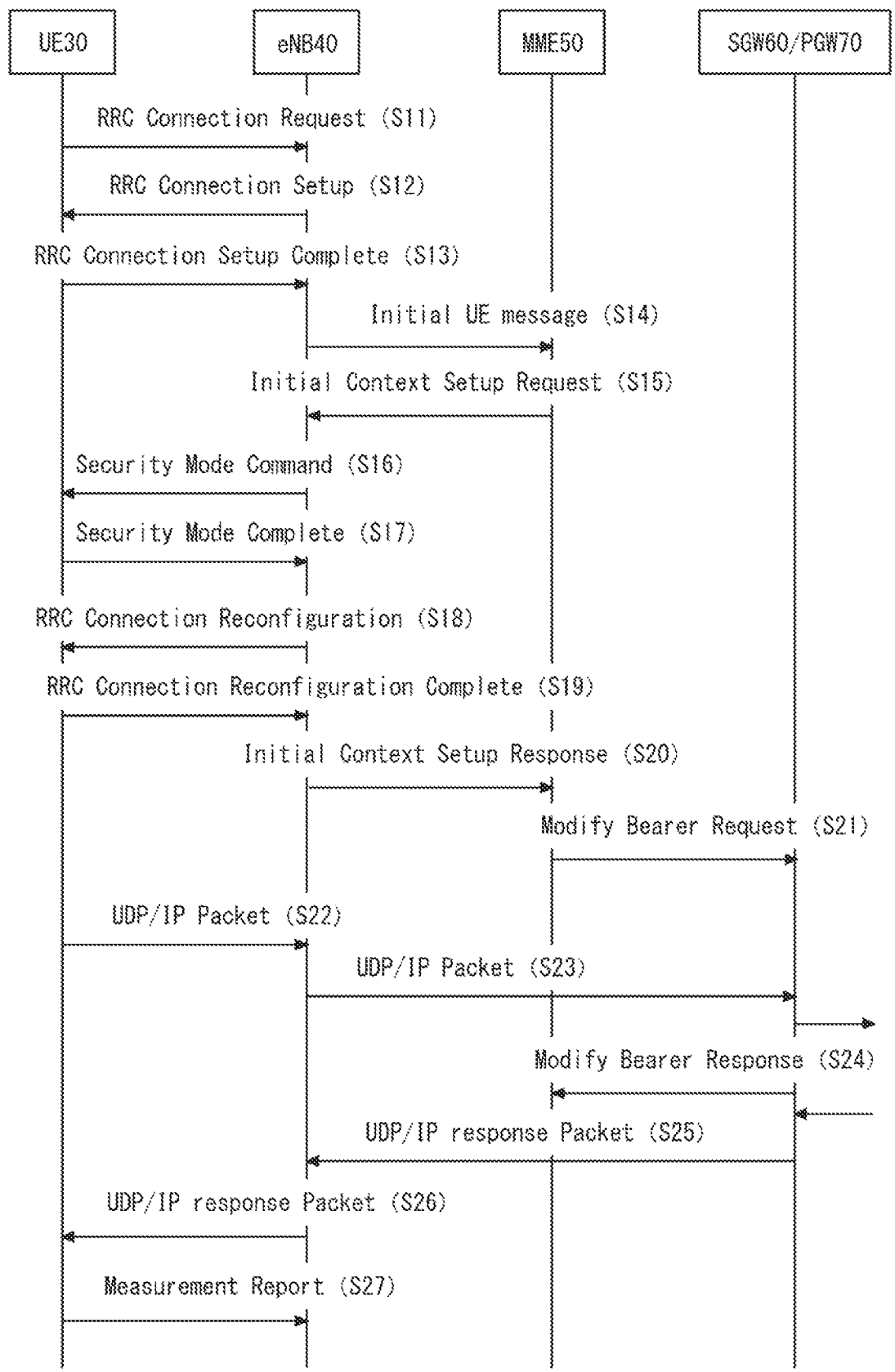
FIG. 9 shows a procedure for establishing a radio link specified in 3GPP.
Figure 10:
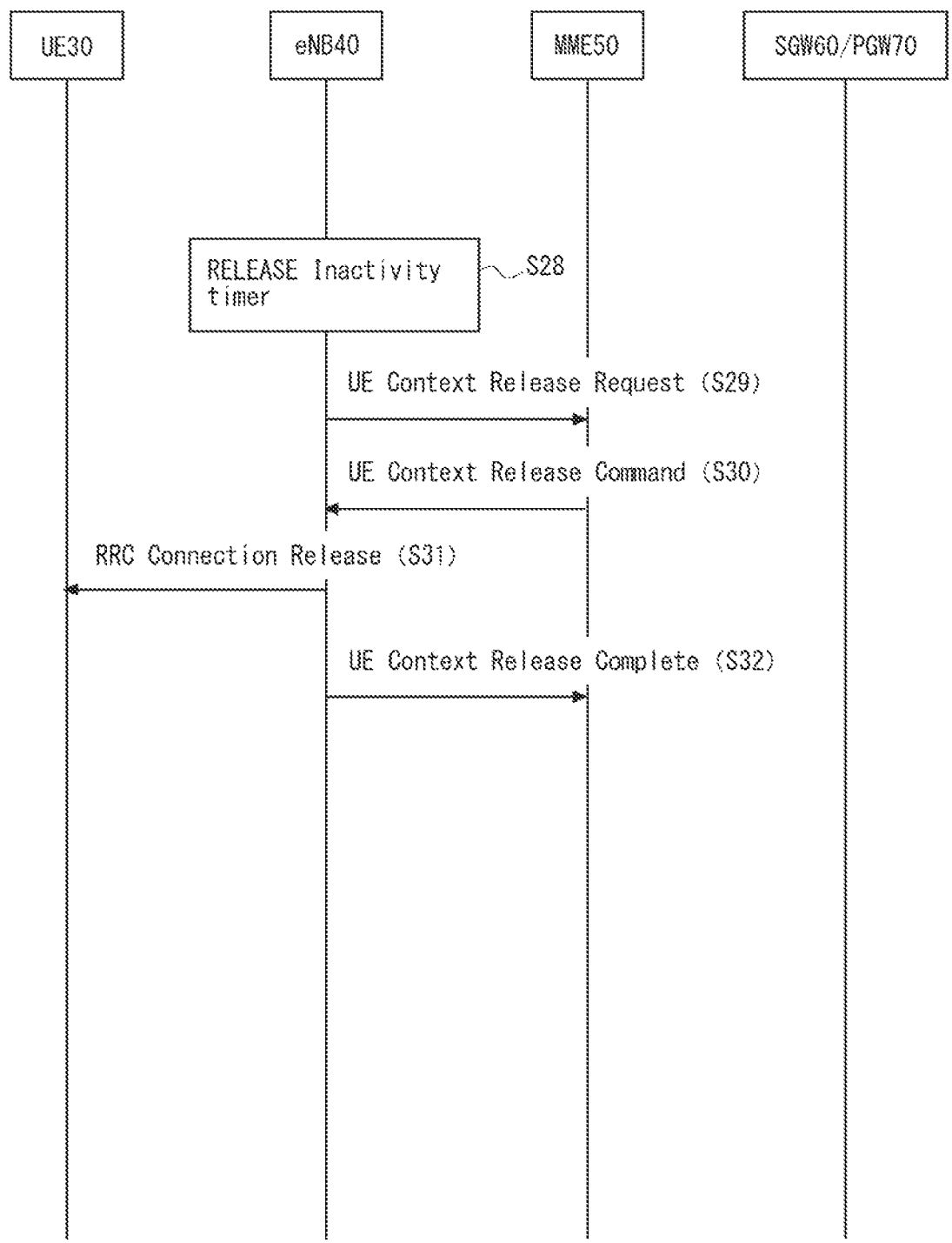
FIG. 10 shows a procedure for establishing a radio link specified in 3GPP.

In accordance with the processes shown in FIGS. 9 and 10, the UE 30, which is an IoT device, transmits small data as user data. That is, the UE 30 transmits the small data as the UDP/IP packet in the step S22. Further, even though the UE 30 is an IoT device, the security setting is made between the UE 30 and the eNB 40 in the steps S16 and S17 just as in the case where the UE 30 is a smartphone or the like.

Next, a flow of an Attach procedure according to the second embodiment is explained with reference to FIG. 7. The Attach procedure is a process that is performed in order to register the UE 30 in a network when the power of the UE 30 is turned on.

Firstly, when a user turns on the power of the UE 30, it transmits an RRC Connection Request message to the eNB 40 (S41). Next, in response to the RRC Connection Request message, the eNB 40 transmits an RRC Connection Setup message to the UE 30 (S42).

Next, the UE 30 transmits an RRC Connection Setup Complete message to the eNB 40 (S43). The UE 30 sets profile information about the UE 30 in an NAS:ATTACH message, i.e., an NAS message included in an RRC Connection Setup complete message. The ATTACH message may be an ATTACH REQUEST message.

The UE 30 sets, for example, at least one of Traffic Channel (U-Plane) unnecessary information, a low-security request information, and a hand-over process unnecessary information in the NAS:ATTACH message.

Alternatively, the UE 30 may set category information represented by a bit string consisting of three bits in the NAS:ATTACH message as the profile information. Further, the UE 30 may indicate the information by setting/non-setting of flags.

Next, the eNB 40 transmits an Initial UE message in which an NAS:ATTACH message is set to the MME 50 (S44). The NAS:ATTACH message is the NAS:ATTACH message transmitted from the UE 30.

Upon receiving the NAS:ATTACH message transmitted from the eNB 40, the MME 50 performs an Attach procedure between the MME 50 and the UE 30 (S45). In the Attach procedure performed in the step S45, a procedure specified in 3GPP (Section TS 23.401 5.3.2.1 or the like) is performed. Detailed explanation of the procedure of the Attach procedure is omitted here.

Upon completing the Attach procedure for the UE 30 in the step S45, the MME 50 transmits an ATTACH accept message to the UE 30 via the eNB 40 (S46 and S47). Note that when at least one of the Traffic Channel unnecessary information, the low-security request information, and the hand-over process unnecessary information is set in the NAS:ATTACH message received in the step S44, the MME 50 determines whether or not it can instruct the eNB 40 about at least one of skipping of the procedure for configuring a radio resource used for user data communication, skipping of the procedure for setting security between the MME 50 and the UE 30, and the elimination of the need for a hand-over process.

When the MME 50 can instruct the eNB 40 about at least one of the skipping of the procedure for configuring a radio resource used for user data communication, the skipping of the procedure for setting security between the MME 50 and the UE 30, and the elimination of the need for a hand-over process, the MME 50 sets an EPC type in an S1 message that is used to carry the ATTACH accept message. The EPC type indicates that the MME 50 can instruct the eNB 40 about at least one of the skipping of the procedure for configuring a radio resource used for user data communication, the skipping of the procedure for setting security between the MME 50 and the UE 30, and the elimination of the need for a hand-over process. Further, when the MME 50 can instruct the UE 30 about at least one of the skipping of the procedure for configuring a radio resource used for user data communication, the skipping of the procedure for setting security between the MME 50 and the UE 30, and the elimination of the need for a hand-over process, the MME 50 sets the EPC type in the ATTACH accept message. The EPC type indicates that the MME 50 can instruct the UE 30 about at least one of the skipping of the procedure for configuring a radio resource used for user data communication, the skipping of the procedure for setting security between the MME 50 and the UE 30, and the elimination of the need for a hand-over process.

Next, the eNB 40 transmits the ATTACH accept message transmitted from the MME 50 to the UE 30 (S47).

As explained above, the UE 30 can receive the ATTACH accept message in which the EPC type is set by performing the Attach procedure. In this way, the UE 30 can recognize whether or not the MME 50 can instruct the eNB 40 about the skipping of the procedure for configuring a radio resource used for user data communication and the skipping of the procedure for setting security between the MME 50 and the UE 30.

Figure 7:
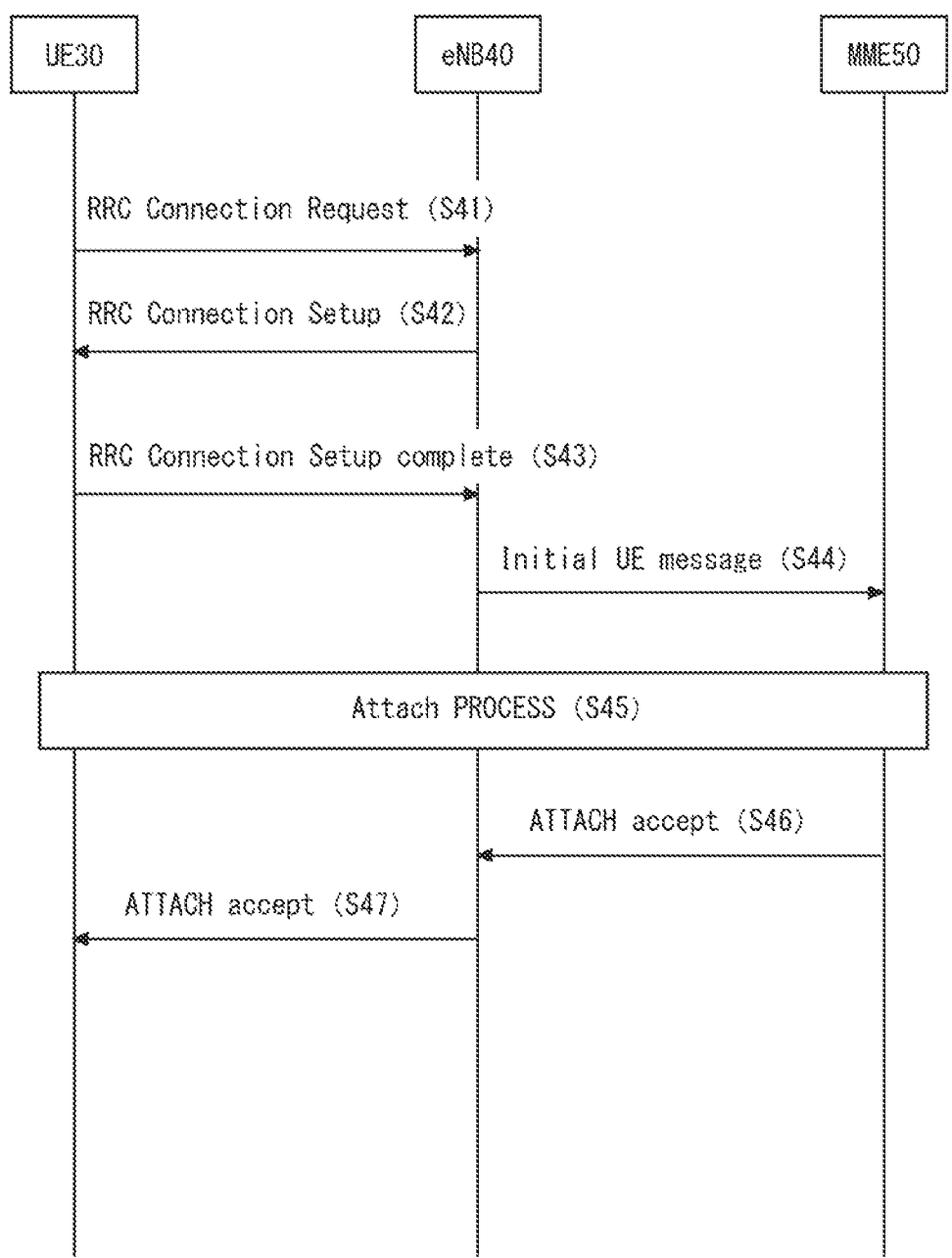
FIG. 7 shows a flow of an Attach procedure according to the second embodiment.

Further, in FIG. 7, the UE 30 does not set profile information of the UE 30 in the RRC message in the step S41. Therefore, the UE 30 does not receive the eNB type that indicates whether or not the eNB 40 can skip a part of the processes for establishing a radio link in the step S42. Examples of the part of the processes for establishing a radio link include a procedure for configuring a radio resource used for user data communication and a procedure for setting security between the eNB 40 and the UE 30.

There is a possibility that the UE 30 does not transmit small data simultaneously with the execution of the Attach procedure. As a result, the UE 30 does not need to receive the eNB type from the eNB 40 during the Attach procedure and hence does not necessarily have to transmit the profile information in the step S41.

On the other hand, when the UE 30 transmits small data during the Attach procedure, the UE 30 may set the profile information of the UE 30 in the step S41. Further, the UE 30 may set other profile information in an RRC message that can be processed by the eNB 40, in addition to the profile information set in the NAS:ATTACH message in the step S43.

Examples of the case where the eNB that communicates with the UE 30 during the Attach procedure is the same as the eNB that communicates with the UE 30 during the transmission of small data include the following situations:
(1) Situation in which the UE 30 does not move; and
(2) Situation in which the UE 30 is in close proximity to the eNB 40 and even when a radio environment around the UE 30 varies, the eNB with which the UE 30 communicates is not changed.

When the profile information of the UE 30 is set in the step S41, the eNB 40 may transmit an RRC Connection Setup message, in which the eNB type is set, to the UE 30 in the step S42. Further, even when the profile information of the UE 30 is not set in the step S41, the eNB 40 may transmit the RRC Connection Setup message in which the eNB type is set to the UE 30 in the step S42. Alternatively, when the profile information of the UE 30 is set in the RRC message in the step S43, the eNB 40 may transmit an ATTACH accept message in which the eNB type is set to the UE 30 in the step S47. Further, even when the profile information of the UE 30 is not set in the RRC message in the step S43, the eNB 40 may transmit the RRC message for transferring the ATTACH accept message in which the eNB type is set to the UE 30 in the step S47.

Figure 8:
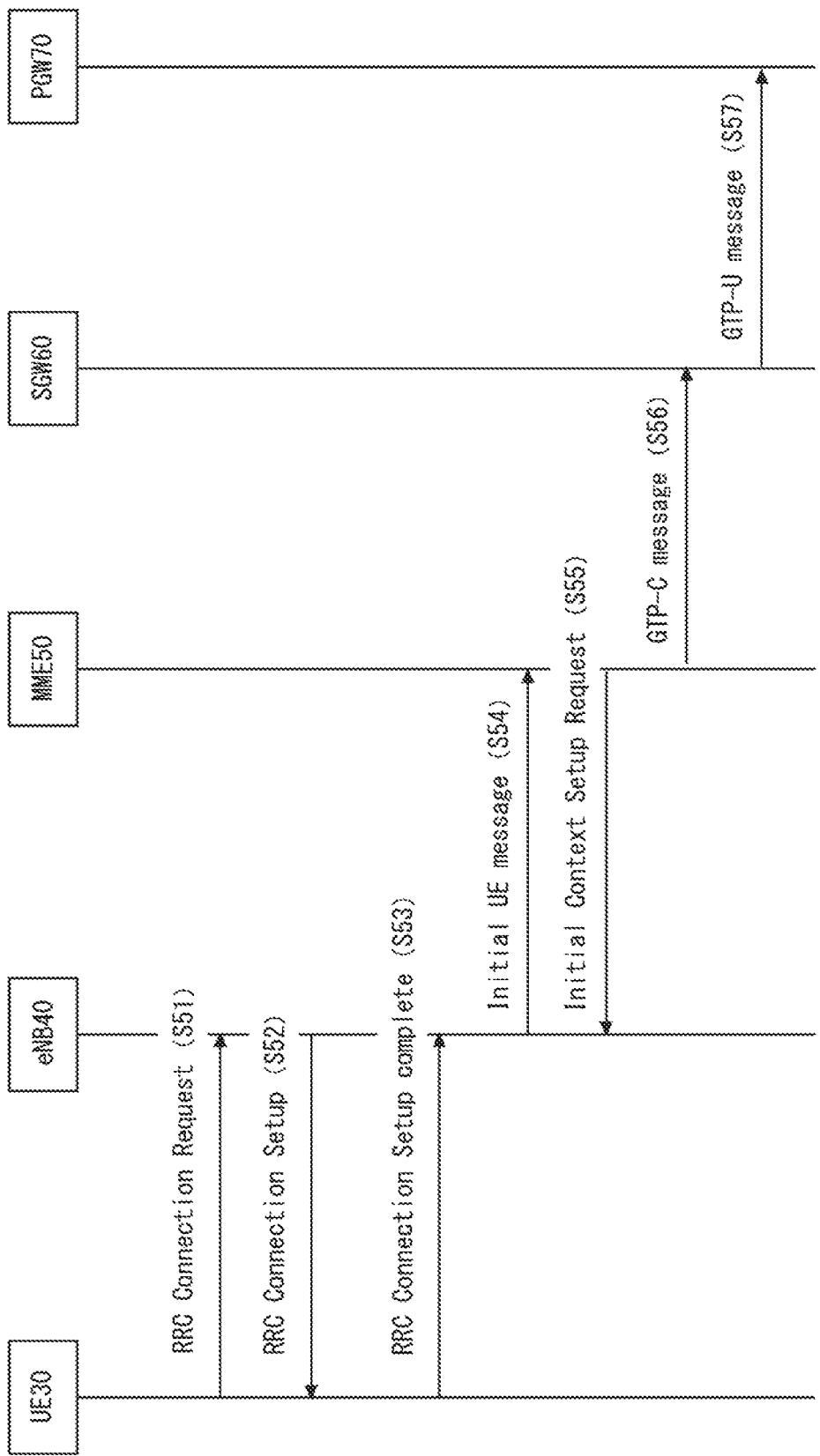
FIG. 8 shows a flow of a small data transmitting process according to the second embodiment.

Next, a flow of a process for transmitting small data according to the second embodiment is explained with reference to FIG. 8. In FIG. 8, it is assumed that an Attach procedure for the UE 30 has been already completed and hence the UE 30 is in an IDLE state.

Firstly, the UE 30 transmits an RRC Connection Request message to the eNB 40 (S51). Next, in response to the RRC Connection Request message, the eNB 40 transmits an RRC Connection Setup message to the UE 30 (S52).

The UE 30 may transmit the RRC Connection Request message, in which the profile information is set in the step S51, to the eNB 40. In this case, the eNB 40 sets an eNB type in the RRC Connection Setup message in the step S52.

Next, the UE 30 transmits an RRC Connection Setup Complete message to the eNB 40 (S53). Note that when the UE 30 has already received the eNB type and the EPC type, it sets an NAS:Service Request message in which profile information and small data are set in the RRC Connection Setup Complete message. For example, assume that the UE 30 sets Traffic Channel unnecessary information and low-security request information as the profile information.

When the UE 30 has not set the profile information in the RRC message in the step S51, it sets the profile information in the RRC Connection Setup Complete message. That is, the UE 30 sets the profile information in both the RRC message and the NAS message.

Next, the eNB 40 transmits an Initial UE message, in which the NAS:Service Request message transmitted from the UE 30 is set, to the MME 50 (S54).

Next, the MME 50 transmits an Initial Context Setup Request message to the eNB 40 (S55). By transmitting the Initial Context Setup Request message, the MME 50 may notify the eNB 40 that the procedure for configuring a radio resource used for user data communication and the procedure for setting security between the MME 50 and the UE 30 may be skipped, and the need for a hand-over process is eliminated.

The skipping of the procedure for configuring a radio resource used for user data communication may be, for example, skipping of the processes in the steps S18 to S32 in FIG. 9. The skipping of the security setting procedure may be skipping of the processes in the steps S16 and S17.

The MME 50 may notify the eNB 40 of the skipping of the security setting procedure by setting no updated security Key in the Initial Context Setup Request message. Further, the MME 50 may notify the eNB 40 of the skipping of the procedure for configuring a radio resource used for user data communication by setting a flag or the like.

After the eNB 40 has received the Initial Context Setup Request message in the step S55, the processes in the step S16 and the subsequent steps in FIGS. 9 and 10 are skipped.

Next, the MME 50 transmits a GTP-C message in which the small data received in the step S54 is set to the SGW 60 (S56). The GTP-C message is control data transmitted/received between the MME 50 and the SGW 60. Next, the SGW 60 transmits a GTP-U message in which the small data received in the step S56 is set to the PGW 70 (S57). The GTP-U message is user data transmitted/received between the SGW 60 and the PGW 70. The SGW 60 may transmit a GTP-C message in which the small data received in the step S56 is set to the PGW 70 (S57).

When the UE 30 has not received the eNB type and the EPC type, the UE 30 may not transmit the profile information and the processes in FIGS. 9 and 10 may be performed in the UE 30, the eNB 40, and the MME 50. That is, the procedure for configuring a radio resource used for user data communication and the security setting procedure are performed without being skipped. The case in which the UE 30 has not received the eNB type and the EPC type is a case in which the eNB 40 and the MME 50 do not support skipping of the procedure for configuring a radio resource used for user data communication and the procedure for setting security between the eNB 40 or the MME 50 and the UE 30.

Further, when the UE 30 has already received the eNB type but has not received the EPC type, the UE 30 may transmit the profile information and request to skip the procedure for configuring a radio resource used for user data communication and the procedure for setting security between the eNB 40 or the MME 50 and the UE 30.

The case in which the UE 30 has received only the eNB type is a case in which the eNB 40 supports the skipping of the procedure for configuring a radio resource used for user data communication and the procedure for setting security between the eNB 40 and the UE 30 but the MME 50 does not support the skipping of the procedure for configuring a radio resource used for user data communication and the procedure for setting security between the MME 50 and the UE 30.

In this case, for example, the eNB 40 may skip the processes in the steps S16 and S17 in FIG. 9 by skipping the transmission of the Security Mode Command in the step S16 even when the updated security Key is transmitted in the step S55.

Further, the eNB 40 has recognized that the UE 30 transmits small data based on the profile information transmitted from the UE 30. Therefore, the UE 30 may skip the processes in the step S18 and the subsequent steps in FIG. 9 even when the UE 30 is not notified of the instruction about skipping of the procedure for configuring a radio resource used for user data communication in the step S30.

Further, when hand-over process unnecessary information is transmitted from the UE 30 as the profile information, the eNB 40 can skip a hand-over process for the UE 30. Examples of the hand-over process for the UE 30 include a process for monitoring radio quality of the UE 30 and the like. Therefore, the eNB 40 can reduce a processing load on the eNB 40 itself by skipping the hand-over process for the UE 30.

As explained above, the eNB 40 and the MME 50 can skip transmission/reception of messages between the UE 30 and the eNB 40 according to the profile information of the UE 30. In this way, it is possible to reduce the number of messages transmitted/received by the UE 30 and thereby to reduce the power consumption of the UE 30. As a result, it is possible to reduce the frequency of battery charging operations and battery replacement operations for the UE 30.

Further, when the eNB 40 and the MME 50 do not support skipping of the procedure for configuring a radio resource used for user data communication and the procedure for setting security between the eNB 40 or the MME 50 and the UE 30, the UE 30 can perform a procedure for transmitting small data as user data.

In this way, even when the eNB 40 and the MME 50 that do not support skipping of the procedure for configuring a radio resource used for user data communication and the procedure for setting security between the eNB 40 or the MME 50 and the UE 30 are present in a communication system together with those supporting the skipping, the UE 30 can transmit small data to the IoT sever 80.

Further, by using hand-over process unnecessary information as the profile information, the UE 30 can reduce a processing load on the eNB 40.

Figure 11:
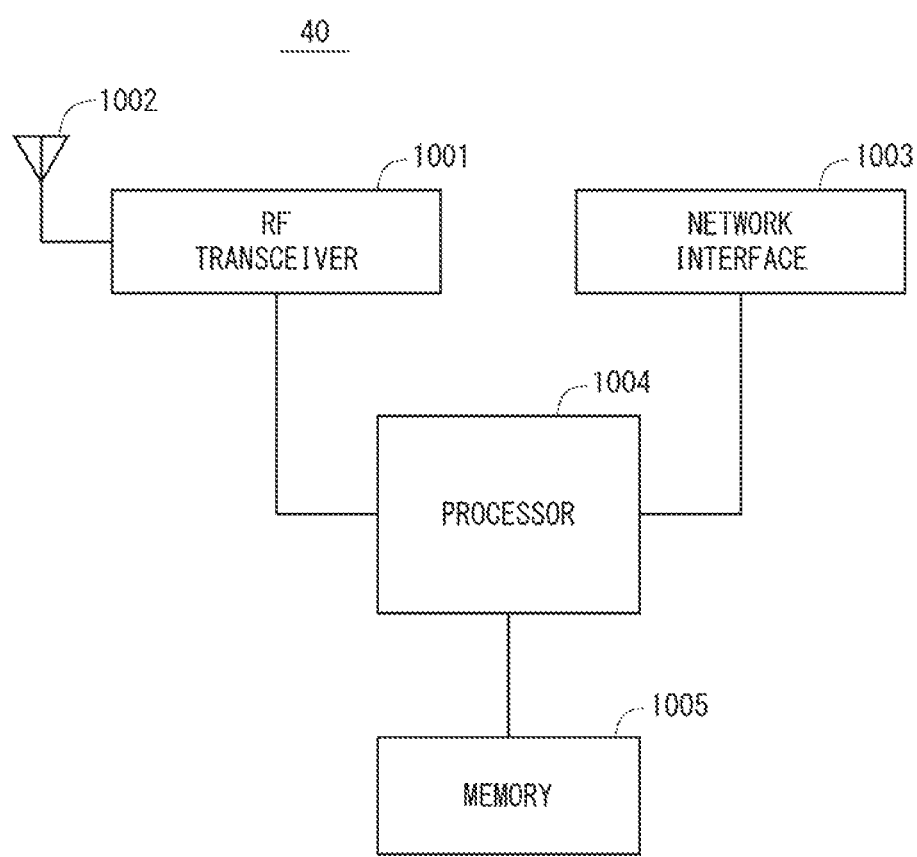
FIG. 11 is a configuration diagram of an eNB according to each embodiment.

Next, configuration examples of the network apparatus 10, the communication terminal 20, the UE 30, the eNB 40, and the MME 50, which are explained in the above-described plurality of embodiments, are explained hereinafter. FIG. 11 is a block diagram showing a configuration example of the eNB 40. As shown in FIG. 11, the eNB 40 includes an RF transceiver 1001, a network interface 1003, a processor 1004, and a memory 1005. The RF transceiver 1001 performs an analog RF signal process in order to communicate with UEs. The RF transceiver 1001 may include a plurality of transceivers. The RF transceiver 1001 is connected to an antenna 1002 and the processor 1004. The RF transceiver 1001 receives modulation symbol data (or OFDM symbol data) from the processor 1004, generates a transmission RF signal, and supplies the generated transmission RF signal to the antenna 1002. Further, the RF transceiver 1001 generates a baseband reception signal based on a reception RF signal received through the antenna 1002 and supplies the generated baseband reception signal to the processor 1004.

The network interface 1003 is used for communication with a network node (e.g., other eNBs, Mobility Management Entities (MMEs), Serving Gateways (S-GWs), and TSSs or ITS servers). The network interface 1003 may include, for example, a network interface card (NIC) in conformity with IEEE 802.3 series.

The processor 1004 performs a data-plane process including a digital baseband signal process for radio communication, and a control-plane process. For example, in the case of LTE or LTE-Advanced, the digital baseband signal process performed by the processor 1004 may include signal processes in a PDCP layer, an RLC layer, a MAC layer, and a PHY layer. Further, the signal process performed by the processor 1004 may include signal processes in a GTP-UUDP/IP layer in an X2-U interface and an S1-U interface. Further, the control-plane process performed by the processor 1004 may include processes in accordance with an X2AP protocol, an S1-MME protocol, and an RRC protocol.

The processor 1004 may include a plurality of processors. For example, the processor 1004 may include a modem-processor (e.g., a DSP) that performs a digital baseband signal process, a processor (e.g., a DSP) that performs signal processes in a GTP-UUDP/IP layer in an X2-U interface and an S1-U interface, and a protocol-stack-processor (e.g., a CPU or an MPU) that performs a control-plane process.

The memory 1005 is formed by a combination of a volatile memory and a nonvolatile memory. The memory 1005 may include a plurality of physically-independent memory devices. The volatile memory is, for example, a Static Random Access Memory (SRAM), a Dynamic RAM (DRAM), or a combination thereof. The nonvolatile memory is, for example, a Read Only Memory (MROM), an Electrically Erasable Programmable ROM (EEPROM), a flash memory, a hard disk drive, or a combination thereof. The memory 1005 may include a storage disposed apart from the processor 1004. In this case, the processor 1004 may access the memory 1005 through the network interface 1003 or an I/O interface (not shown).

The memory 1005 may store a software module (a computer program) including a group of instructions and data for performing processes performed by the eNB 40 explained in the above-described plurality of embodiments. In some implementations, the processor 1004 may be configured so that it performs processes performed by the eNB 40 explained in the above-described embodiments by reading the software module from the memory 1005 and executing the read software module.

Figure 12:
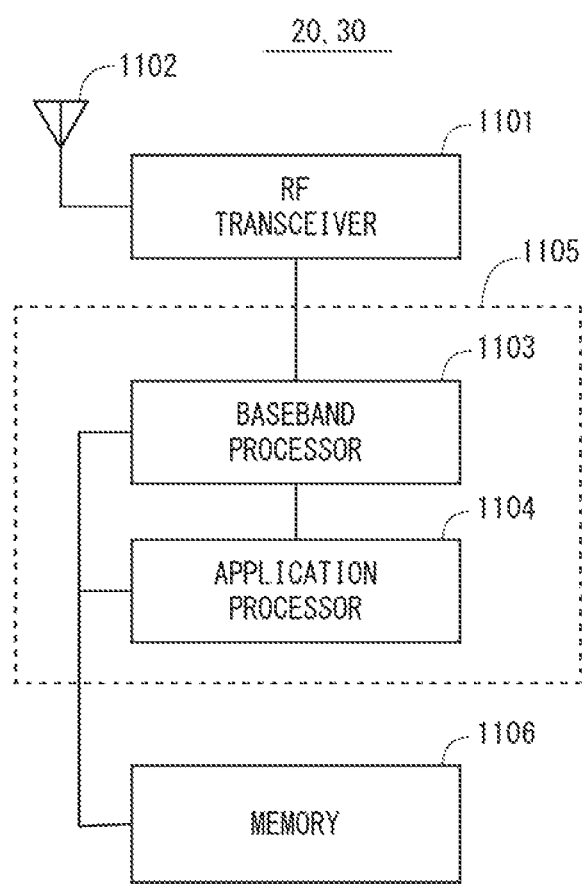
FIG. 12 is a configuration diagram of a communication terminal and a UE according to each embodiment.

FIG. 12 is a block diagram showing a configuration example of the communication terminal 20 and the UE 30. A Radio Frequency (RF) transceiver 1101 performs an analog RF signal process in order to communicate with the eNB 40. The analog RF signal process performed by the RF transceiver 1101 includes a frequency up-conversion, a frequency down-conversion, and amplification. The RF transceiver 1101 is connected to an antenna 1102 and a baseband processor 1103. That is, the RF transceiver 1101 receives modulation symbol data (or OFDM symbol data) from the baseband processor 1103, generates a transmission RF signal, and supplies the generated transmission RF signal to the antenna 1102. Further, the RF transceiver 1101 generates a baseband reception signal based on a reception RF signal received through the antenna 1102 and supplies the generated baseband reception signal to the baseband processor 1103.

The baseband processor 1103 performs a digital baseband signal process for radio communication (a data-plane process) and a control-plane process. The digital baseband signal process includes (a) data compression/restoration, (b) data segmentation/concatenation, (c) transfer format (transfer frame) generation/decomposition, (d) transfer path encoding/decoding, (e) modulation (symbol mapping), (f) OFDM symbol data (baseband OFDM signal) generation by Inverse Fast Fourier Transform (IFFT), and so on. Meanwhile, the control-plane process includes communication management in a layer 1 (e.g., transmission power control), a layer 2 (e.g., radio resource management and a hybrid automatic repeat request (HARQ)), and a layer 3 (e.g., attach, mobility, and signaling related to telephone-call management).

For example, in the case of LTE or LTE-Advanced, the digital baseband signal process performed by the baseband processor 1103 may include signal processes in a Packet Data Convergence Protocol (PDCP) layer, a Radio Link Control (RLC) layer, a MAC layer, and a PHY layer. Further, the control-plane process performed by the baseband processor 1103 may include a Non-Access Stratum (NAS) protocol, an RRC protocol, and a MAC CE process.

The baseband processor 1103 may include a modem-processor (e.g., a Digital Signal Processor (DSP)) that performs a digital baseband signal process and a protocol-stack-processor (e.g., a Central Processing Unit (CPU), or a Micro Processing Unit (MPU)) that performs a control-plane process. In this case, the same processor may be used as both the aforementioned protocol-stack-processor that performs a control-plane process and a later-described application processor 1104.

The application processor 1104 is also referred to as a CPU, an MPU, a microprocessor, or a processor core. The application processor 1104 may include a plurality of processors (or a plurality of processor cores). The application processor 1104 implements various functions of the communication terminal 20 and the UE 30 by executing a system software program (Operating System (OS)) and various application programs (e.g., a telephone-call application, a WEB browser, a mailer, a cameral operation application, and a music playback application) read from a memory 1106 or other memories (not shown).

In some implementations, the baseband processor 1103 and the application processor 1104 may be integrally disposed (or formed) on one semiconductor chip as indicated by broken lines (1105) in FIG. 12. In other words, the baseband processor 1103 and the application processor 1104 may be implemented as one System on Chip (SoC) device 1105. The SoC device may also be called a system LSI (Large Scale Integration) or a chip set.

The memory 1106 is a volatile memory, a nonvolatile memory, or a combination thereof. The memory 1106 may include a plurality of physically-independent memory devices. The volatile memory is, for example, a Static Random Access Memory (SRAM), a Dynamic RAM (DRAM), or a combination thereof. The nonvolatile memory is, for example, a Read Only Memory (MROM), an Electrically Erasable Programmable ROM (EEPROM), a flash memory, a hard disk drive, or a combination thereof. For example, the memory 1106 may include an external memory device that can be accessed by the baseband processor 1103, the application processor 1104, and the SoC 1105. The memory 1106 may include an internal memory device integrally disposed (or formed) in the baseband processor 1103, the application processor 1104, or the SoC 1105. Further, the memory 1106 may include a memory disposed in a Universal Integrated Circuit Card (UICC).

The memory 1106 may store a software module (a computer program) including a group of instructions and data for performing processes performed by the UE 40 explained in the above-described plurality of embodiments. In some implementations, the baseband processor 1103 or the application processor 1104 may be configured so that it performs processes performed by the communication terminal 20 and the UE 30 explained in the above-described embodiments by reading the software module from the memory 1106 and executing the read software module.

Figure 13:
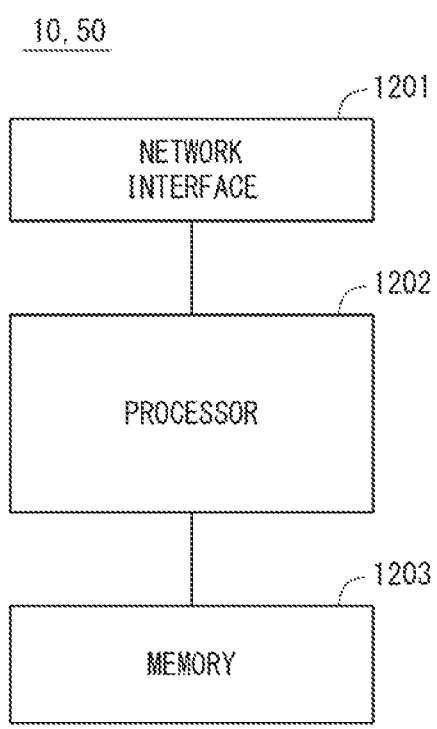
FIG. 13 is a configuration diagram of a network apparatus and an MME according to each embodiment.

FIG. 13 is a block diagram showing a configuration example of the network apparatus 10 and the MME 50. As shown in FIG. 13, the network apparatus 10 and the MME 50 include a network interface 1201, a processor 1202, and a memory 1203. The network interface 1201 is used for communication with a network node (e.g., the eNodeB 130, the MME, the P-GW). The network interface 1201 may include, for example, a network interface card (NIC) in conformity with IEEE 802.3 series.

The processor 1202 performs processes performed by the network apparatus 10 and the MME 50 explained with reference to the sequence diagrams and the flowcharts in the above-described embodiments by reading a software module from the memory 1203 and executing the read software module. The processor 1202 may be, for example, a microprocessor, an MPU, or a CPU. The processor 1202 may include a plurality of processors.

The memory 1203 is formed by a combination of a volatile memory and a nonvolatile memory. The memory 1203 may include a storage disposed apart from the processor 1202. In this case, the processor 1202 may access the memory 1203 through an I/O interface (not shown).

In the example shown in FIG. 13, the memory 1203 is used to store a group of software modules. The processor 1202 can perform processes performed by the network apparatus 10 and the MME 50 explained in the above-described embodiments by reading the group of software modules from the memory 1203 and executing the read software modules.

As explained above with reference to FIGS. 11 and 13, each of the processors included in the network apparatus 10, the communication terminal 20, the UE 30, the eNB 40, and the MME 50 in the above-described embodiments executes one or a plurality of programs including a group of instructions to cause a computer to perform an algorithm explained above with reference to the drawings.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described embodiments and can be modified as appropriate without departing from the spirit and scope of the present disclosure.

Although the present disclosure is explained above with reference to embodiments, the present disclosure is not limited to the above-described embodiments. Various modifications that can be understood by those skilled in the art can be made to the configuration and details of the present disclosure within the scope of the present disclosure.

This application is based upon and claims the benefit of priority from Japanese patent applications No. 2015-146266, filed on Jul. 24, 2015, the disclosure of which is incorporated herein in its entirety by reference.

The whole or part of the embodiments disclosed above can be described as, but not limited to, the following supplementary notes.

(Supplementary Note 1)

A network apparatus comprising:
a communication unit configured to receive profile information of a communication terminal transmitted from the communication terminal; and
a determination unit configured to determine, in a procedure for establishing a radio link between the network apparatus and the communication terminal, whether or not to skip at least one of a procedure for configuring a radio resource used for communication of user data between the network apparatus and the communication terminal and a procedure for setting security between the network apparatus and the communication terminal according to the profile information, wherein
the communication unit receives small data transmitted from the communication terminal through the radio link.

(Supplementary Note 2)

The network apparatus described in Supplementary note 1, wherein when the profile information indicates that the small data is transmitted by using a radio resource for control data, the determination unit skips the procedure for configuring a radio resource used for user data communication between the network apparatus and the communication terminal in the procedure for establishing the radio link between the network apparatus and the communication terminal.

(Supplementary Note 3)

The network apparatus described in Supplementary note 1 or 2, wherein when the profile information indicates that the small data does not need to be encrypted or is encrypted in a simplified level as security level information, the determination unit skips the procedure for setting security between the network apparatus and the communication terminal.

(Supplementary Note 4)

The network apparatus described in Supplementary note 3, wherein the determination unit skips the procedure for setting security between the network apparatus and the communication terminal by stopping updating of a security key used between the network apparatus and the communication terminal.

(Supplementary Note 5)

The network apparatus described in any one of Supplementary notes 1 to 4, wherein when the communication unit receives the profile information, it transmits information indicating that the radio resource configuring procedure and the security setting procedure can be skipped to the communication terminal.

(Supplementary Note 6)

The network apparatus described in Supplementary note 5, wherein the communication unit sets the information indicating that the radio resource configuring procedure and the security setting procedure can be skipped in an RRC Connection Setup message or an ATTACH Accept message.

(Supplementary Note 7)

A communication terminal comprising:
a communication unit configured to transmit profile information of the communication terminal itself to a network apparatus; and
a reception unit configured to receive, in a procedure for establishing a radio link between the communication terminal and the network apparatus, information about whether or not the communication terminal can skip at least one of a procedure for configuring a radio resource used for communication of user data between the communication terminal and the network apparatus and a procedure for setting security between the communication terminal and the network apparatus according to the profile information from the network apparatus, wherein
the communication unit transmits small data to the network apparatus through the radio link.

(Supplementary Note 8)

The communication terminal described in Supplementary note 7, wherein when the communication unit receives information indicating that the procedure for configuring a radio resource used for the user data communication can be skipped, it transmits the small data to the network apparatus by using a radio resource for control data.

(Supplementary Note 9)

The communication terminal described in Supplementary note 7 or 8, wherein when the communication unit receives information indicating that the procedure for configuring a radio resource cannot be skipped, it transmits the small data to the network apparatus by using a radio resource for user data.

(Supplementary Note 10)

The communication terminal described in any one of Supplementary notes 7 to 9, wherein the communication unit transmits an RRC message and an NAS message in which profile information of the communication terminal itself is set to the network apparatus.

(Supplementary Note 11)

A communication system comprising:
a communication terminal;
a base station configured to perform radio communication with the communication terminal; and
a core-network apparatus configured to control a procedure for establishing a radio link between the communication terminal and the base station, wherein
when the core-network apparatus receives profile information of the communication terminal transmitted from the communication terminal, the core-network apparatus, in the procedure for establishing the radio link, transmits an instruction message to the base station, the instruction message instructing to skip at least one of a procedure for configuring a radio resource used for communication of user data between the base station and the communication terminal and a procedure for setting security between the base station and the communication terminal,
the base station performs the procedure for establishing the radio link while skipping at least one of the procedure for configuring the radio resource used for communication of user data between the base station and the communication terminal and the procedure for setting security between the base station and the communication terminal according to the instruction message, and
the communication terminal transmits small data to the base station through the radio link.

(Supplementary Note 12)

A receiving method comprising:
receiving profile information of a communication terminal transmitted from the communication terminal;
determining, in a procedure for establishing a radio link with the communication terminal, whether or not to skip at least one of a procedure for configuring a radio resource used for communication of user data with the communication terminal and a procedure for setting security with the communication terminal according to the profile information; and
receiving small data transmitted from the communication terminal through the radio link.

(Supplementary Note 13)

A transmitting method comprising:
transmitting profile information of the communication terminal itself to a network apparatus;
receiving, in a procedure for establishing a radio link with the network apparatus, information about whether or not the communication terminal can skip at least one of a procedure for configuring a radio resource used for communication of user data with the network apparatus and a procedure for setting security with the network apparatus according to the profile information from the network apparatus; and
transmitting small data to the network apparatus through the radio link.

(Supplementary Note 14)

A program adapted to cause a computer to:
receive profile information of a communication terminal transmitted from the communication terminal;
determining, in a procedure for establishing a radio link with the communication terminal, whether or not to skip at least one of a procedure for configuring a radio resource used for communication of user data with the communication terminal and a procedure for setting security with the communication terminal according to the profile information; and
receive small data transmitted from the communication terminal through the radio link.

(Supplementary Note 15)

A program adapted to cause a computer to:
transmit profile information of the communication terminal itself to a network apparatus;
receiving, in a procedure for establishing a radio link with the network apparatus, information about whether or not the communication terminal can skip at least one of a procedure for configuring a radio resource used for communication of user data with the network apparatus and a procedure for setting security with the network apparatus according to the profile information from the network apparatus; and
transmit small data to the network apparatus through the radio link.

REFERENCE SIGNS LIST

10 NETWORK APPARATUS
11 COMMUNICATION UNIT
12 DETERMINATION UNIT
20 COMMUNICATION TERMINAL
30 UE
31 IoT APPLICATION
32 NAS CONTROL UNIT
33 AS CONTROL UNIT
34 U-Plane CONTROL UNIT
35 RADIO COMMUNICATION UNIT
40 eNB
41 RADIO COMMUNICATION UNIT
42 CONTROL UNIT
43 NETWORK COMMUNICATION UNIT
50 MME
51 BASE STATION COMMUNICATION UNIT
52 DETERMINATION UNIT
53 CONTROL UNIT
54 NETWORK COMMUNICATION UNIT
60 SGW
70 PGW
80 IoT SERVER

The invention claimed is:

1. A User Equipment (UE) comprising:
at least one memory storing instructions; and
at least one processor configured to execute the instructions to:
perform a registration procedure; and
send, to a base station, a Radio Resource Control (RRC) connection setup complete message including a Non-Access Stratum (NAS) message carrying data and further including first capability information indicating whether the UE supports Cellular Internet of Things (CIoT) data transfer using a Control plane (C-plane).

2. The UE according to claim 1, wherein the UE sends, to a mobility management node, a registration request message including second capability information indicating that the UE supports the CIoT data transfer using the C-plane.

3. The UE according to claim 2, wherein the UE receives, from the mobility management node, a registration accept message including third capability information indicating that the mobility management node supports the CIoT data transfer using the C-plane.

4. A method of a User Equipment (UE), the method comprising:
performing a registration procedure; and
sending, to a base station, a Radio Resource Control (RRC) connection setup complete message including a Non-Access Stratum (NAS) message carrying data and further including first capability information indicating whether the UE supports Cellular Internet of Things (CIoT) data transfer using a Control plane (C-plane).

5. The method according to claim 4, further comprising:
sending, to a mobility management node, a registration request message including second capability information indicating that the UE supports the CIoT data transfer using the C-plane.

6. The method according to claim 5, further comprising:
receiving, from the mobility management node, a registration accept message including third capability information indicating that the mobility management node supports the CIoT data transfer using the C-plane.

7. A base station comprising:
at least one memory storing instructions; and
at least one processor configured to execute the instructions to:
receive, from a User Equipment (UE), a registration request message, and
receive, from the UE, a Radio Resource Control (RRC) connection setup complete message including a Non-Access Stratum (NAS) message carrying data and further including first capability information indicating whether the UE supports Cellular Internet of Things (CIoT) data transfer using a Control plane (C-plane).

8. The base station according to claim 7, wherein the registration request message includes second capability information indicating that the UE supports the CIoT data transfer using the C-plane.

9. The base station according to claim 8, wherein the base station sends, to the UE, a registration accept message including third capability information indicating that a mobility management node supports the CIoT data transfer using the C-plane.

10. A method of a base station, the method comprising:
receiving, from a User Equipment (UE), a registration request message, and
receiving, from the UE, a Radio Resource Control (RRC) connection setup complete message including a Non-Access Stratum (NAS) message carrying data and further including first capability information indicating whether the UE supports Cellular Internet of Things (CIoT) data transfer using a Control plane (C-plane).

11. The method according to claim 10, wherein the registration request message from the UE includes second capability information indicating that the UE supports the CIoT data transfer using the C-plane.

12. The method according to claim 11, further comprising:
sending, to the UE, a registration accept message including third capability information indicating that a mobility management node supports the CIoT data transfer using the C-plane.

* * * * *